United States Patent Office 3,346,548
Patented Oct. 10, 1967

3,346,548
EXTRUSION OF POLYOLEFINS
George B. Feild, New Castle, and Stuart B. Monroe, Wilmington, Del., assignors to Hercules Incorporated, Wilmington, Del.
No Drawing. Filed Oct. 12, 1964, Ser. No. 403,351
1 Claim. (Cl. 260—94.9)

This invention relates to improvements in the extrusion characteristics of high density polyethylene. More particularly, it relates to addition of organic additives to high density polyethylene in order to improve the surface characteristics of extrudates prepared therefrom.

In recent years, high density polyethylene made by means of a transition metal catalyst—so-called Ziegler-type polyethylene—or by a catalyst comprising chromium oxide associated with another oxide such as silica or alumina, has been found to be quite useful in a wide range of applications due to its unique combination of properties such as chemical inertness, durability, moisture vapor impermeability, stiffness, etc. This combination of properties makes high density polyethylene useful in applications such as shotgun shell casings, rods, pipes, wire coating, and the like, which require extrusion of the polymer.

However, extrusion of high density polyethylene sometimes results in an objectionably rough surface. The cause of this roughness is not known for certain but it has been theorized that it may be caused by a multitude of tiny melt fractures on the surface caused by stresses created on that surface during the extrusion and subsequent cooling. It is in any event a problem that is not shared by low density polyethylene made by free radical processes.

The effect of the rough surface is to reduce the effective thickness of the wall of the item sought to be manufactured and correspondingly to reduce the strength, vapor impermeability, and other characteristics which the polyethylene should impart to such an item. Moreover, the articles do not present the desired pleasing appearance.

In the past, high density polyethylene exhibiting poor extrudability has had to be downgraded. Such a quality downgrading, of course, resulted in a lessening of the value of the material.

This invention has as its primary object the provision of a means of eliminating the rough surfaces often encountered in objects extruded from high density polyethylene. According to the invention, the surface roughness can be substantially eliminated or lessened by the incorporation into the polyethylene of a small amount, preferably from about 0.01 to 0.10%, based on the weight of the polyethylene, of bis(triethylene glycol) hydroxymethanephosphonate. This compound has the structural formula:

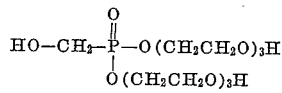

By high density polyethylene is meant the high molecular weight solid polyethylene having a density above about 0.94 produced by polymerizing ethylene at comparatively low pressures and temperatures. Such polymers can be made, for example, by use of catalysts prepared from a transition metal compound and an organoaluminum compound as disclosed by Ziegler in British Patent 799,392, or a catalyst comprising chromium oxide supported on another oxide such as silica, alumina, thoria, or zirconia as disclosed by Hogan and Banks in U.S. 2,825,721.

The high density polyethylenes are essentially linear and unbranched polymers that may be found to have less than 3.0 and frequently even less than 0.03 substituent methyl groups per 100 methylene units in the polymer molecule. The polymers have high densities, about 0.94–0.97 gram per cubic centimeter, melting points in the range of about 125–135° C., are highly crystalline in nature, almost to their melting points, and are insoluble in most solvents at ordinary temperature. Any high density polyethylene can be benefited by the technique of this invention.

Before describing the invention further, the following examples are presented as illustrative of the process of the invention. Parts and percentages are by weight unless otherwise specified.

*Example 1*

High density polyethylene was prepared by bubbling ethylene gas containing 3.6% hydrogen into a polymerization vessel containing a suspension in a saturated aliphatic hydrocarbon of a two-part polymerization catalyst comprising the reaction product of ethylaluminum sesquichloride and $TiCl_4$ in 4:1 molar ratio and an additional quantity of the ethylaluminum sesquichloride. The ethylene was charged to a pressure of 73 p.s.i.a. and allowed to polymerize until a pressure of 20 p.s.i.a. was reached. The catalyst was deactivated by drowning the reacting mass in methanol, the polymer was isolated by filtration and purified by washing with a saturated liquid hydrocarbon. The resulting product had a density of 0.96, a melt index ($i_2$ 190° C.) of 0.1 and a reduced specific viscosity (RSV) measured in decalin at 135° C. of 2.8.

The polyethylene thus prepared was stabilized by addition of 0.5%, based on the polyethylene of 2,6-di-tertiary-butyl-4-methylphenol. A quantity of bis(triethylene glycol) hydroxymethanephosphonate equal to 0.05% by weight of the polyethylene was added to the polyethylene and the mass was extruded into pellets using a compounding extruder. The phosphonate was added to the polymer in the form of a 10% concentrate in polyethylene powder. The pellets were pigmented with cadmium sulfide and extruded and blown into oriented tubing by the process of U.S. Patent 2,961,711 to Diedrich et al. Simultaneously, a control tubing was made, omitting the bis(triethylene glycol) hydroxymethanephosphonate.

The tubing extruded from the polymer modified according to this invention was very smooth and free of surface defects, whereas the unmodified polymer produced tubing exhibiting considerable surface roughness. The tubing was formed into shotgun shells by the process disclosed in U.S. 3,103,170 to Covington et al., and the shells were subjected to a firing test. All of the cases prepared from the polymer modified with the bis(triethylene glycol) hydroxymethanephosphonate passed the firing test, whereas those prepared from the unmodified polymer failed the test.

*Example 2*

Using polymer from the batch prepared for Example 1 and following the same mixing and stabilizing procedure, 0.1% of bis(triethylene glycol) hydroxymethanephosphonate was added to polyethylene. The resulting granules were then extruded into rods. A control run was made simultaneously using stabilized unmodified polyethylene.

The rods containing the bis(triethylene glycol) hydroxymethanephosphonate were smooth and free of surface defects while the control rods exhibited noticeable surface roughness, both visually and to the touch.

The improved surface characteristics of the items produced from the polymers modified according to this invention are readily seen from the foregoing examples. Such smooth surfaces are required for most plastic articles and are, of course, desirable even on those which do not absolutely require smooth surfaces. In addition to the aesthetic value and increased strength imparted by the smooth surface, it is also possible to extrude the polymer at a higher rate when the polymer surface is smooth.

At least one further advantage is gained as a result of adding the phosphonic acid ester to polyethylene. In the usual extrusion operation with polyethylene, it is necessary to shut down the operation periodically to remove deposits which accumulate on the extruder die. The exact make-up of these deposits is unknown. It is believed that at least some portion of it is degraded polyethylene, but there are other unidentified constituents therein. The presence of these deposits on the extruder die can lead to off-quality production as heavy deposits can cause scratching of the surface of the extrudates. Portions of the deposits also frequently are dislodged from the die onto the soft surface of the extrudate, causing surface imperfections. It has been found that when the polymer being extruded has been modified by inclusion of the phosphonic acid ester according to this invention, the formation of these deposits is virtually eliminated. As a result, downtime for the purpose of cleaning the extrusion die is considerably reduced. The decreased downtime permits higher productivity per extrusion unit. The more stable operation also results in greater uniformity of product and thus higher quality.

What we claim and desire to protect by Letters Patent is:

A composition comprising a blend of high density polyethylene having incorporated therein about 0.01 to 0.10% by weight based on the weight of the polyethylene of bis(triethylene glycol) hydroxymethanephosphonate.

No references cited.

JOSEPH L. SCHOEFER, *Primary Examiner.*

L. EDELMAN, *Assistant Examiner.*